US006686538B2

(12) United States Patent
Yamamoto

(10) Patent No.: US 6,686,538 B2
(45) Date of Patent: Feb. 3, 2004

(54) METHOD FOR CONNECTING ELECTRONIC DEVICES AND CONNECTING CABLE

(75) Inventor: Takashi Yamamoto, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/122,005

(22) Filed: Apr. 15, 2002

(65) Prior Publication Data

US 2002/0117316 A1 Aug. 29, 2002

Related U.S. Application Data

(62) Division of application No. 09/341,961, filed as application No. PCT/JP98/00320 on Jan. 26, 1998, now Pat. No. 6,395, 977.

(30) Foreign Application Priority Data

Jan. 30, 1997 (JP) ............................................ 9-15810

(51) Int. Cl.[7] .......................... H01B 11/06; H02G 15/02
(52) U.S. Cl. ...................... 174/36; 174/75 C; 174/88 C
(58) Field of Search ........................ 174/36, 78, 102 R, 174/28, 74 R, 75 C, 84 R, 88 C

(56) References Cited

U.S. PATENT DOCUMENTS

| | | | | |
|---|---|---|---|---|
| 2,047,152 A | * 7/1936 | Mitchell | 123/633 |
| 2,243,851 A | * 6/1941 | Booth et al. | 174/103 |
| 3,626,287 A | 12/1971 | Di Niro | 324/61 R |
| 4,335,412 A | 6/1982 | Aschwanden | 361/50 |
| 4,510,468 A | 4/1985 | Mayer | 333/12 |
| 4,589,398 A | * 5/1986 | Pate et al. | 123/594 |
| 4,599,483 A | 7/1986 | Kuhn et al. | 174/36 |
| 4,656,870 A | 4/1987 | Ruthrof et al. | 73/629 |
| 4,754,102 A | 6/1988 | Dzurak | 174/36 |
| 4,871,883 A | 10/1989 | Guiol | 174/36 |
| 5,095,891 A | 3/1992 | Reitter | 128/24 |
| 5,146,048 A | 9/1992 | Yutori et al. | 174/36 |
| 5,150,442 A | 9/1992 | Desmons | 385/101 |
| 5,266,744 A | 11/1993 | Fitzmaurice | 174/103 |
| 5,414,213 A | 5/1995 | Hillburn | 174/36 |
| 5,463,323 A | 10/1995 | Wakamatusu | 324/611 |
| 5,539,323 A | 7/1996 | Davis, Jr. | 324/690 |
| 5,548,082 A | 8/1996 | Palmer | 174/34 |
| 5,818,243 A | 10/1998 | Wakamatusu | 324/629 |
| 5,876,528 A | 3/1999 | Nikkels et al. | 156/48 |
| 5,959,245 A | 9/1999 | Moe et al. | 174/36 |

FOREIGN PATENT DOCUMENTS

JP 08153545 A 6/1996

* cited by examiner

*Primary Examiner*—William H. Mavo, III
(74) *Attorney, Agent, or Firm*—Parkhurst & Wendel, L.L.P.

(57) ABSTRACT

A connection method and a connecting cable for improving transmission of low-frequency signals, and reducing the radiation level of high-frequency signals, including a connecting cable having at least two ends, a first external conductor for shielding at least one signal line capable of conveying a signal and having a frequency that causes undesired radiation, the first external conductor having a length about co-extensive with the length of the signal lines, a second external conductor spaced adjacent the first external conductor with an insulator between the first and second external conductors, the length of the second external conductor being less than the length of the first external conductor and defined in terms of such frequency, the length of the second external conductor being for suppressing undesired radiation. The first external conductor is for connecting to a reference potential of a first electronic device connected by the signal line, and the second external conductor is for connecting to a reference potential of a second electronic device.

28 Claims, 12 Drawing Sheets

METHOD FOR CONNECTING ELECTRONIC DEVICES AND CONNECTING CABLE

This is a Division of application Ser. No. 09/341,961 filed Jul. 21, 1999, now U.S. Pat. No. 6,395,977, issued Sep. 28, 2002.

FIELD OF THE INVENTION

The present invention relates to a method for connecting electronic devices and a connecting cable.

BACKGROUND OF THE INVENTION

As shown in FIGS. 12(*a*) and (*b*), to transmit a signal from a first electronic device 1*a* to a second electronic device 1*b*, a connection is provided as shown in FIG. 12(*a*) or FIG. 12(*b*), using a connecting cable 4 in which a signal line 2 is shielded by a first external conductor 3*a*.

In the connection of FIG. 12(*a*), one end of the signal line 2 is connected to the signal output 5 of the first electronic device 1*a*, the other end of the signal line 2 is connected to the signal input 6 of the second electronic device 1*b*, one end of the first external conductor 3*a* is connected to a frame 7, which is the reference potential of the first electronic device 1*a*, and the other end of the first external conductor 3*a* is connected to a frame 8, which is the reference potential of the second electronic device 1*b*.

In such connection, if there is no potential difference between the frames 7 and 8, good signal transmission can be realized, but, if the signal level is low and there is a potential difference between the frames 7 and 8, then noise mixes into the signal input 6 of the second electronic device 1*b*.

In this case, one-point grounding connects the first external conductor 3*a* only to the frame 7 of the first electronic device 1*a*, without connecting the other end of the first external conductor 3*a* to the frame 8 of the second electronic device 1*b*.

However, assuming the case in which the first electronic device 1*a* and the second electronic device 1*b* are spaced a long distance apart from each other and low-frequency signals (the frequency band is several tens KHz to several tens MHZ) and high-frequency signals (the frequency band is several tens MHZ or higher) are transmitted by the signal line 2, or the case in which a digital signal of a high-frequency is transmitted, the one-point grounding as shown in FIG. 12(*b*) problematically increases the level of undesired radiation of high-frequency signals from the first external conductor 3*a* into the air.

In this conventional example, the description has been made to one connecting cable 4 by way of example, but, in the connection by a plurality of connecting cables which are placed in parallel between the first electronic device 1*a* and the second electronic device 1*b*, there is a problem that noise radiated from the respective juxtaposed connecting cables 4 interferes with each other to further increase the undesired radiation level.

It is the object of the present invention to provide a connection method and a connecting cable, which enable good transmission of low-frequency signals as well as lowering the radiation level of high-frequency signals in such case as described above.

BRIEF SUMMARY OF THE INVENTION

The method for connecting electronic devices of the present invention is characterized by connecting a first electronic device 1*a* and a second electronic device 1*b* with a first external conductor being one-point grounded, and connecting an end of a second external conductor on the second electronic device 1*b* side to reference potential of the second electronic device 1*b* for high-frequency signals, thereby providing a connection between the electronic devices, and enabling good transmission of low-frequency signals as well as lowering the radiation level of high-frequency signals.

The method for connecting electronic devices as set forth in a first embodiment is characterized in that, to connect electronic devices by a connecting cable, the part between the ends of the signal line of the connecting cable is shielded by a first external conductor, one end of the first external conductor is connected to the reference potential of one electronic device of the electronic devices, the first external conductor is shielded by a second external conductor, the second external conductor is connected to the reference potential of the other electronic device, whereby the reference potential of one electronic device and the reference potential of the other electronic device are coupled through the stray capacity between the first external conductor and the second external conductor.

With this arrangement, the first external conductor is one-point grounded to the first electronic device preventing the difference in the reference potential levels of the first and second electronic devices from being brought into the second electronic device, whereby good transmission of low-frequency signals can be accomplished, and the impedance of the first external conductor to high-frequency signals decreases, reducing undesired radiation.

The method for connecting electronic device as set forth in a second embodiment is characterized in that, to connect electronic devices by a connecting cable, the signal lines of a plurality of connecting cables are respectively shielded by a first external conductor between the ends thereof, one of the respective first external conductors is connected to the reference potential of one electronic device of the electronic devices, the respective first external conductors are shielded by a common second external conductor, and the second external conductor is connected to the reference potential of the other electronic device, whereby the reference potential of one electronic device and the reference potential of the other electronic device are coupled through the stray capacity between the first and second external conductors.

With this arrangement, the respective first external conductors are one-point grounded to the first electronic device preventing the difference in the reference potential level between the first and second electronic devices from being brought into the second electronic device, whereby good transmission of low-frequency signals can be accomplished, and the impedance of the respective first external conductors decreases, reducing.

The method for connecting electronic devices as set forth in a third embodiment is characterized in that, to connect electronic devices by a connecting cable, the signal lines of a plurality of connecting cables are respectively shielded by a first external conductor in the part between the ends thereof, one end of the respective first external conductor is connected to the reference potential of one electronic device of the electronic devices, the respective first external conductors are electrically connected to each other in the other end thereof, the respective first external conductors are shielded by a common second external conductor, and the second external conductor is connected to the reference potential of the other electronic device, whereby the reference potential of one electronic device and the reference potential of the other electronic device are coupled through the stray capacity between the first external conductor and the second external conductor.

With this arrangement, because the first external conductors are electrically connected to each other, in addition to the construction of the second embodiment, the system of each first external conductor for high-frequency signals is stable as compared with the case in which the first external conductors are not positively made equipotential in the other end thereof, and no independent standing wave occurs in the respective first external conductors.

The method for connecting electronic devices as set forth in a fourth embodiment is characterized in that the length of opposition between the first and second external conductors is adjusted according to a frequency for which undesired radiation is to be suppressed.

The method for connecting electronic devices as set forth in a fifth embodiment is characterized in that the adjustment is performed by connecting, between the first and second external conductors, a capacitor element having a capacitance according to the frequency for which undesired radiation is to be suppressed.

With this arrangement, the undesired radiation of the high frequency band can be reduced by the action of a stray capacity between the first and second external conductors, and the cutoff frequency of the low frequency band for high frequencies is adjusted by the capacitor element connected between the first and second external conductors to suppress undesired radiation.

The method for connecting electronic devices as set forth in a sixth embodiment is characterized in that, to connect electronic devices by a connecting cable, signal lines of a plurality of connecting cables are respectively shielded by first external conductors between the ends thereof, one end of the respective first external conductors is connected to the reference potential of one of the electronic devices, the other ends of the respective first external conductors are electrically connected to each other, the respective first external conductors are shielded by a common second external conductor, the second external conductor is connected to reference potential of the other electronic device, and the other ends of the respective first external conductors are electrically connected to each other, and covered with a third external conductor which contacts the outside of a bundle of the first external conductors of a plurality of connecting cables and opposed to the second external conductor, whereby the reference potential of one electronic device and the reference potential of the other electronic device are coupled through a stray capacity between the second external conductor and the third external conductor.

With this arrangement, the bundle of the first external conductors of a plurality of connecting cables is covered with a third external conductor, thereby connecting the first external conductor to the reference potential of the second electronic device by the stray capacity generated between the second and third external conductors, and thus the stray capacity generated between the second and third external conductors does not depend on the diameter of the respective first external conductors.

The method for connecting electronic devices as set forth in a seventh embodiment is characterized in that the length of opposition between the second and third external conductors is adjusted according to the frequency with which undesired radiation is to be suppressed.

The method for connecting electronic devices as set forth in an eighth embodiment is characterized in that the adjustment is performed by connecting, between the third and second external conductors, a capacitor element having a capacitance corresponding to the frequency with which undesired radiation is to be suppressed. With this arrangement, the undesired radiation of the target frequency can be selectively suppressed.

The method for connecting electronic devices as set forth in a ninth embodiment is characterized in that at least one of the second and third external conductors is a braided wire.

The method for connecting electronic devices as set forth in a tenth embodiment is characterized in that a sheet made up of a first and second conductor sheets opposed to each other through an insulation film is wound around the connecting cable, making the inner first conductor sheet as the third external conductor and the outer second conductor sheet as the second external conductor, whereby the reference potential of one electronic device and the reference potential of the other electronic device are coupled through the stray capacity between the first conductor sheet and the second conductor sheet.

With this arrangement, the number of steps in the terminal process can be reduced and large stray capacity can be obtained by thinning the thickness of the insulation film of the sheet.

The method for connecting electronic devices as set forth in an eleventh embodiment is characterized in that, to connect electronic devices by a connecting cable, signal lines of a plurality of connecting cables are respectively shielded by a first external conductor between one end and the other end thereof, one end of the respective first external conductors is connected to reference potential of one electronic device of the electronic devices, and the other ends of the respective first external conductors are electrically connected to each other and connected to reference potential of the other electronic device, thereby preventing a standing wave from being independently generated in the first external conductor of each connecting cable.

With this arrangement, as compared with the case in which the first external conductors are not positively made equipotential to each other at the other end thereof, the system of each external conductor toward high-frequency signals becomes stable, and a standing wave does not separately occurs in the respective first external conductors, so it is suitable for transmission of digital signals.

The connecting cable as set forth in a twelfth embodiment is characterized by comprising a first external conductor for shielding signal lines between one end and the other end thereof, and a second external conductor opposed to the first external conductor through an insulator and for shielding the first external conductor, wherein the first external conductor on one end of the signal line is connected to reference potential of one electronic device connected by the signal line, and the second external conductor on the other end of the signal line is connected to reference potential of the other electronic device.

The connecting cable as set forth in a thirteenth embodiment is characterized by comprising a first external conductor for shielding the part between the ends of a signal line, and a second external conductor opposed to the first external conductor through an insulator and for shielding part of the other end of the first external conductor, wherein the first external conductor on one end of the signal line is connected to reference potential of one electronic device connected by the signal line, the second external conductor on the other end of the signal line is connected to reference potential of the other electronic device, and at least one parameter of the length of opposition between the first external conductor and the second external conductor, the electrode distance between the first and second external conductors, and the material of the insulator are set according to a frequency with which undesired radiation is to be suppressed.

The connecting cable as set forth in a fourteenth embodiment is characterized in that there is provided a capacitor element connected between the first and second external conductors, and the capacitance of the capacitor element is set to a capacitance corresponding to the frequency with which undesired radiation is to be suppressed.

The connecting cable as set forth in fifteenth embodiment is characterized in that the second external conductor is a braided wire, and the distal end of the second external conductor of a braided wire is folded back to the side of one end of the signal line.

DETAILED DESCRIPTION OF THE INVENTION

Now, the respective embodiments of the present invention are described according to FIGS. 1 to 11.

Embodiment 1

Figure 1:
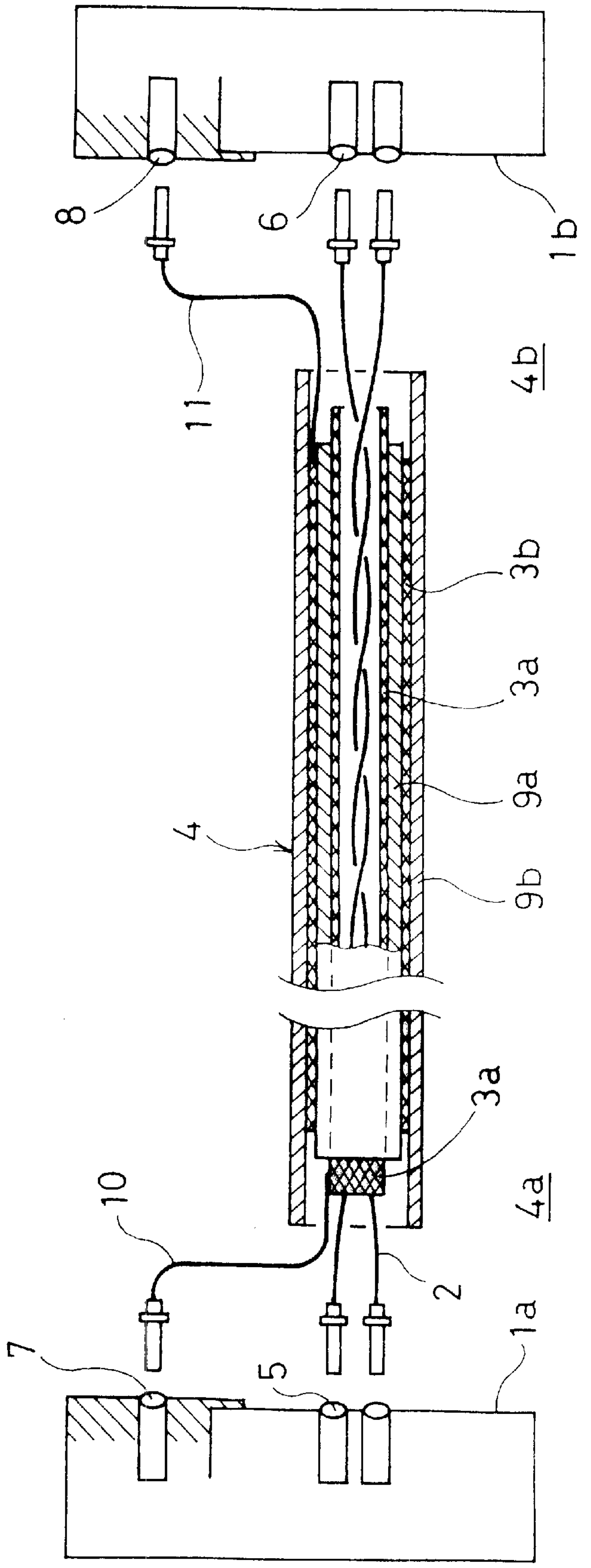
FIG. 1 is a cross-sectional view of a connection method and connecting cable according to embodiment 1 of the present invention.
Figure 2:
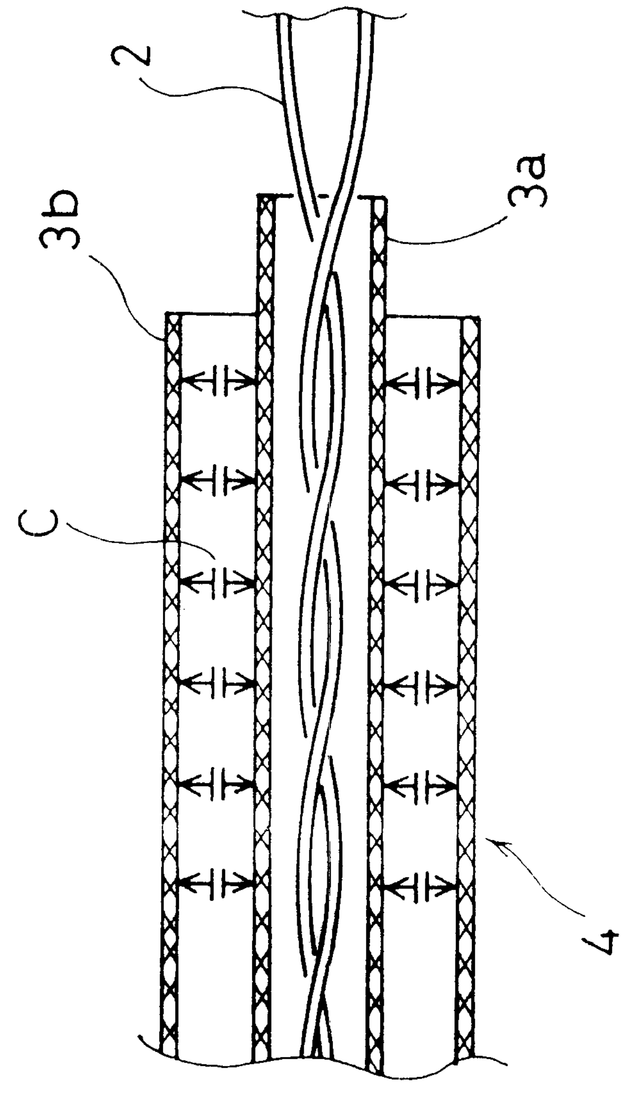
FIG. 2 is an explanatory view of a stray capacity formed between the first and second external conductors according to the embodiment 1.

FIG. 1 and FIG. 2 show the first embodiment.

A connecting cable 4 for connecting a first electronic device 1*a* and a second electronic device 1*b* is surrounded by the first external conductor 3*a* of a braided wire so as to be shielded in most of the full length thereof, over one end 4*a* to the other end 4*b* of a signal line 2 connecting between the signal output 5 of the first electronic device 1*a* and the signal input 6 of the second electronic device 1*b*.

The outside of the first external conductor 3*a* is covered with a first external sheath 9*a*, and the further outside of it is surrounded by the second external conductor 3*b* of a braided wire over one end to the other end thereof for shielding. The outside of the second external conductor 3*b* is covered with a second external sheath 9*b*.

One end of the first external conductor 3*a* is connected to a frame 7 of the reference potential of the first electronic device 1*a*. The end of the first external conductor 3*a* is not connected to a frame 8 of the reference potential of the second electronic device 1*b*.

The end portion on the other end 4*b* side of the second external conductor 3*b* is connected to the frame 8 of the reference potential of the second electronic device 1*b* through a lead 11.

With this arrangement, since the connecting cable 4, when looking the second electronic device 1*b* from the first electronic device 1*a*, is one-point grounded to the frame 7 of the first electronic device 1*a* for low-frequency signal band (frequency band of several tens KHz to several tens MHZ), a signal can be successfully transmitted to the signal input 6 of the second electronic device 1*b* even if a potential difference is generated between the frame 7 of the first electronic device 1*a* and the frame 8 of the second electronic device 1*b*. For a high-frequency signal band (frequency band of several tens MHZ or higher), the frame 7 of the first electronic device 1*a* and the frame 8 of the second electronic device 1*b* are coupled through a stray capacity C generated between the first and second external conductors 3*a* and 3*b*, which are opposed to each other through the first external sheath 9*a*, as shown in FIG. 2, the impedance of the first external conductor 3*a* in the high-frequency signal band can be made low even though the first external conductor 3*a* is one-point earthed.

Accordingly, the level of the signal induced in the first external conductor 3*a* according to the signal applied to the signal line 2 and undesirably radiated to the outside can be significantly reduced as compared with the prior art.

Although the first and second external conductors 3*a* and 3*b* are both of a braided wire, a similar effect can be expected even if both or one of them is replaced by aluminum foil or metal pipe.

Embodiment 2

Figure 3:
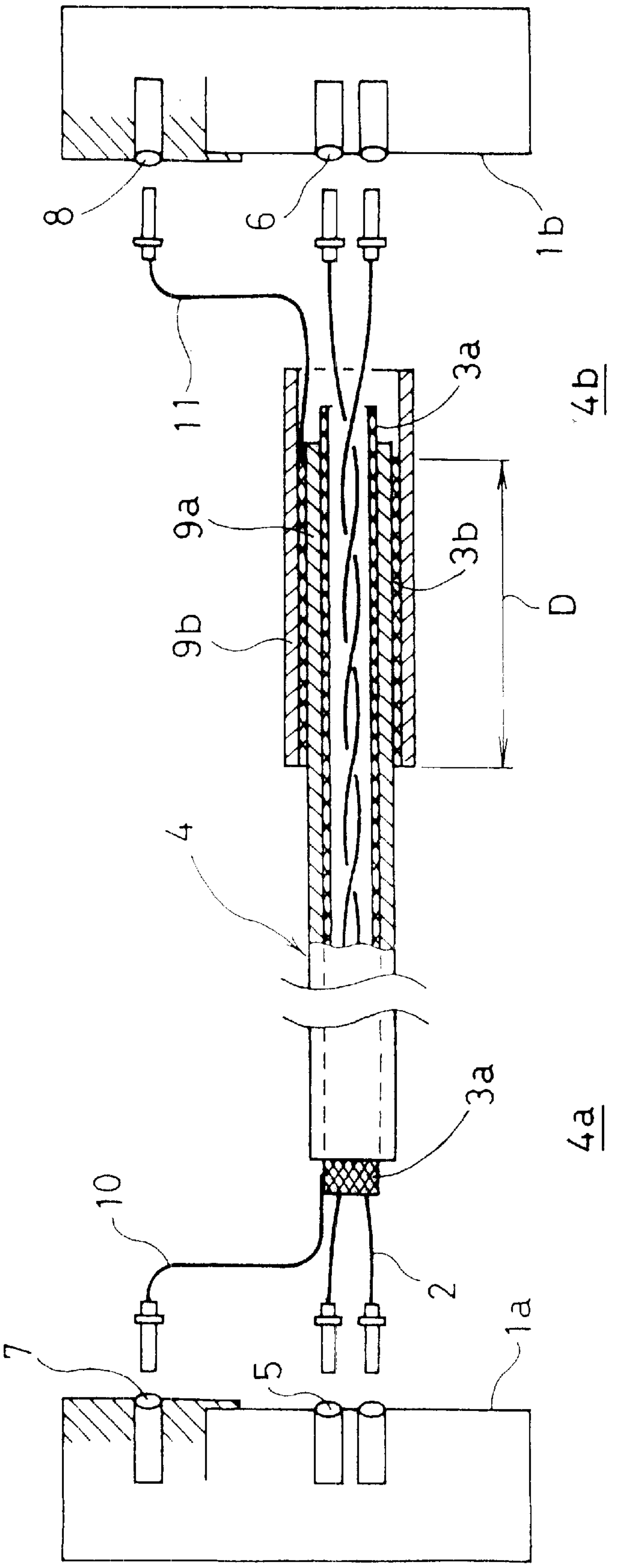
FIG. 3 is a cross-sectional view of a connecting cable for a connection method according to embodiment 2.
Figure 4:
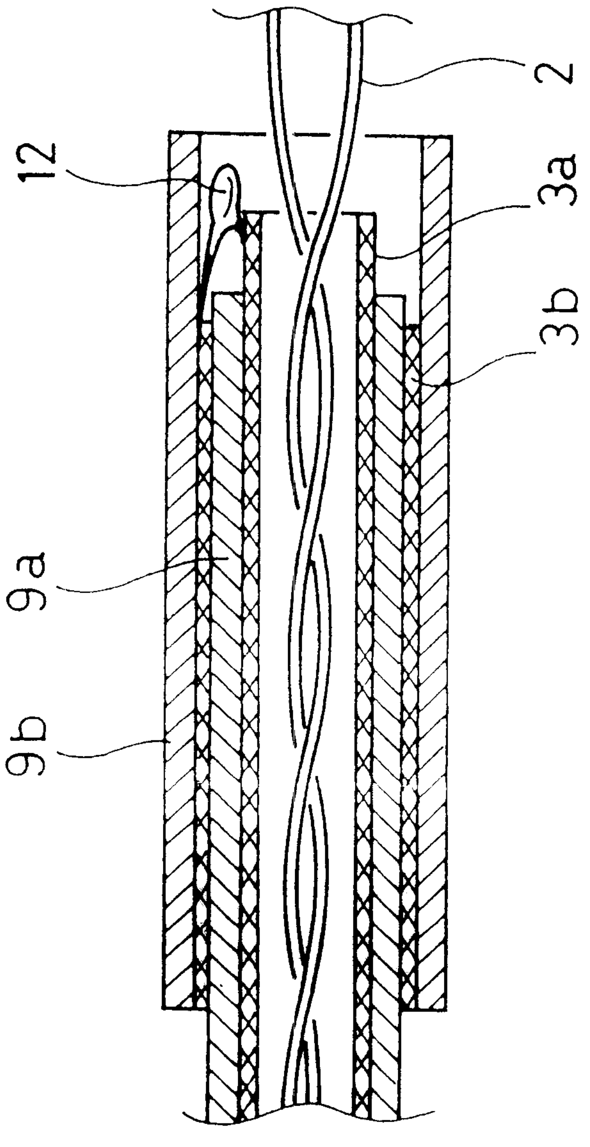
FIG. 4 is a cross-sectional view of a connecting cable showing another embodiment of the embodiment 2.

FIG. 3 and FIG. 4 show the second embodiment.

The second external conductor 3*b* of the first embodiment is provided opposite to the most part of the first external conductor 3*a*, but, in embodiment 2, it is partially provided on the other end 4*b* side of the first external conductor 3*a* so as to be opposed to the first external conductor 3*a* over only an opposed length D, also called an overlapping length D. The opposed length D is set to an opposed distance needed to generate a stray capacity, which can make the impedance of the first external conductor 3*a* high for a low-frequency signal region, and can make the impedance of the first external conductor 3*a* low in a high-frequency signal region.

With this arrangement, by changing the opposed length D, the frequency for which undesired radiation is to be suppressed can be freely adjusted. Further, since the length of the second external conductor 3*b* can be made short as compared with the second embodiment, the connecting cable 4 can easily be manufactured.

Further, as shown in FIG. 4, by interposing a ceramic capacitor 12 of several tens pF to tens of thousands pF between the first external conductor 3*a* and the second external conductor 3*b* on the second electronic device 1*b* side of the connecting cable 4 shown in FIG. 3, the undesired radiation of part of the high-frequency region of a low-frequency signal region can also be reduced. Specifically, by adding a large capacitance which cannot be obtained by the above stray capacity by means of the ceramic capacitor 12, the impedance of the connecting cable in the low-frequency signal region can be reduced in the low-frequency signal region of several tens KHz to 10 MHZ.

In addition, a similar effect can be expected even if the first and second external conductors 3*a* and 3*b* are both made up of a braided wire, or both or one of them is replaced by aluminum foil or metal pipe.

Embodiment 3

Figure 5:
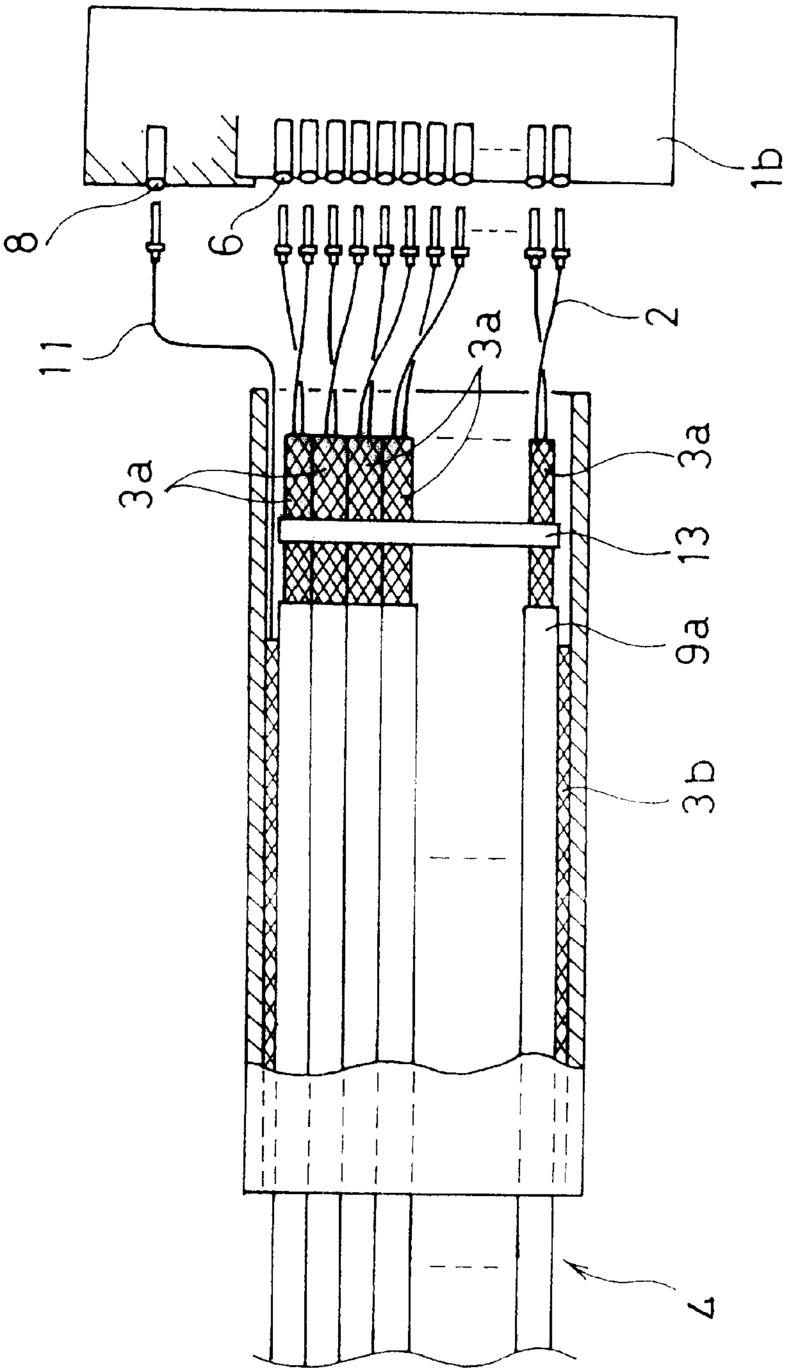
FIG. 5 is a cross-sectional view of a connecting cable for a connection method according to embodiment 3.
Figure 6:
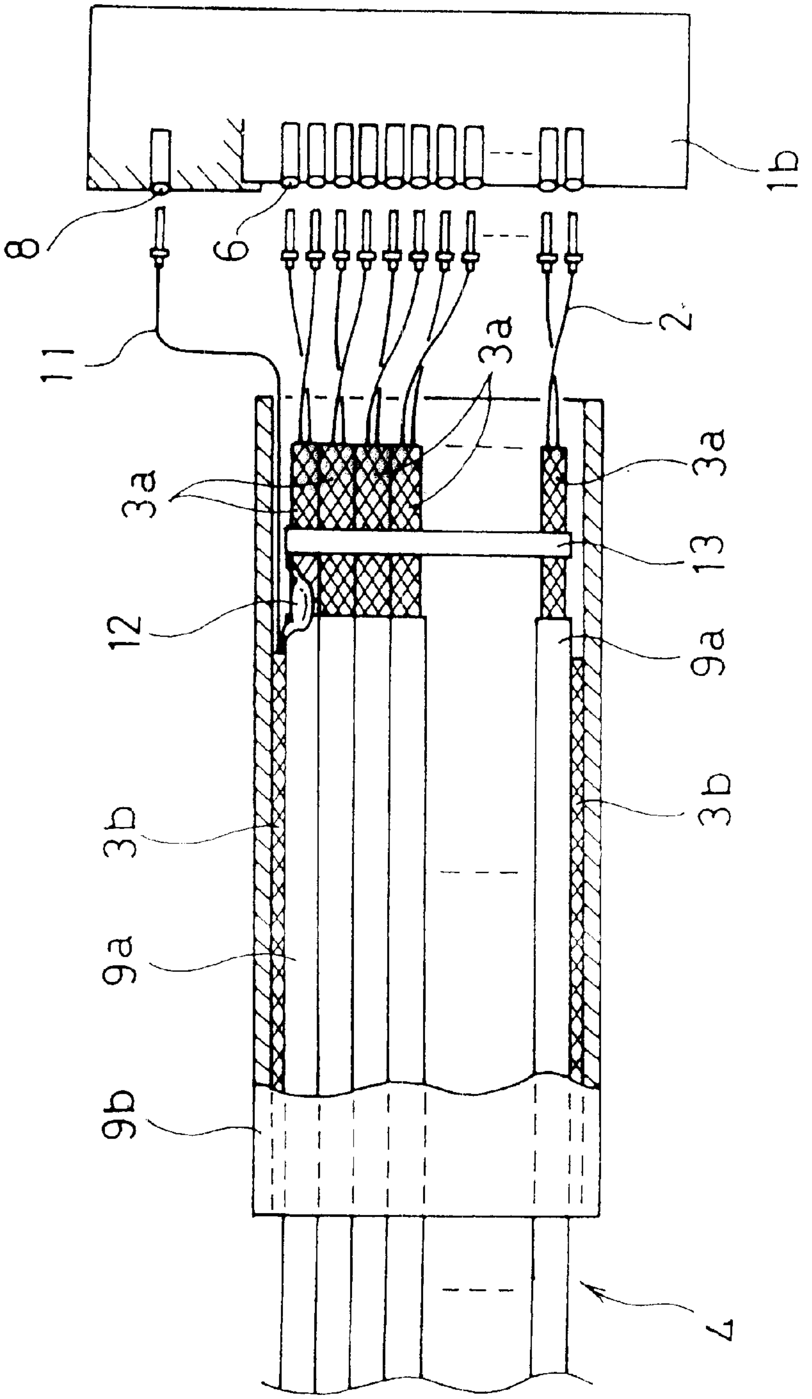
FIG. 6 is a cross-sectional view of a connecting cable showing another embodiment of the embodiment 3.

FIG. 5 and FIG. 6 show the third embodiment.

In the first and second embodiments, the signal line 2 covered with the first external sheath 9*a* is provided within the single second external conductor 3*b*. However, in the third embodiment, a plurality of signal lines 2 each covered with the first external sheath 9*a* is provided within a single second external conductor 3*b*.

In FIG. 5, the respective first external conductors 3*a* are tied together in the other end thereof by a tying band 13 of an insulator (or a conductor), and by tightening the tying band 13, the respective first external conductors 3*a* are brought in contact with each other to make electrical connection. The remaining points are the same as FIG. 3.

Further, by winding a single wire or braided wire around the first external conductor 3*a* so as to tie them together in the other end thereof, and soldering them rather than tying the first external conductor 3*a* together in the other end thereof, a similar effect can also be obtained. If the first external conductor 3*a* and the second external conductor 3*b* are tied together by a conductor in the other end thereof, the first external conductor 3*a* and the second external conductor 3*b* are insulated from each other so that they do not conduct through a lead 11.

With this arrangement, even if signals of different frequencies are applied to the plurality of signal lines 2, no standing wave occurs in each of the first external conductor 3*a* of different frequencies, and thus the system of the plurality of first external conductors 3*a* in a high-frequency signal region becomes stable.

In FIG. 6, a ceramic capacitor 12 of a small capacitance is added to the construction shown in FIG. 5, and the remaining points are the same as FIG. 4.

In addition, even if the first and second external conductors 3*a* and 3*b* are comprised of a braided wire, or both or one of them is replaced by aluminum foil or metal pipe, a similar effect can be expected.

Embodiment 4

Figure 7:
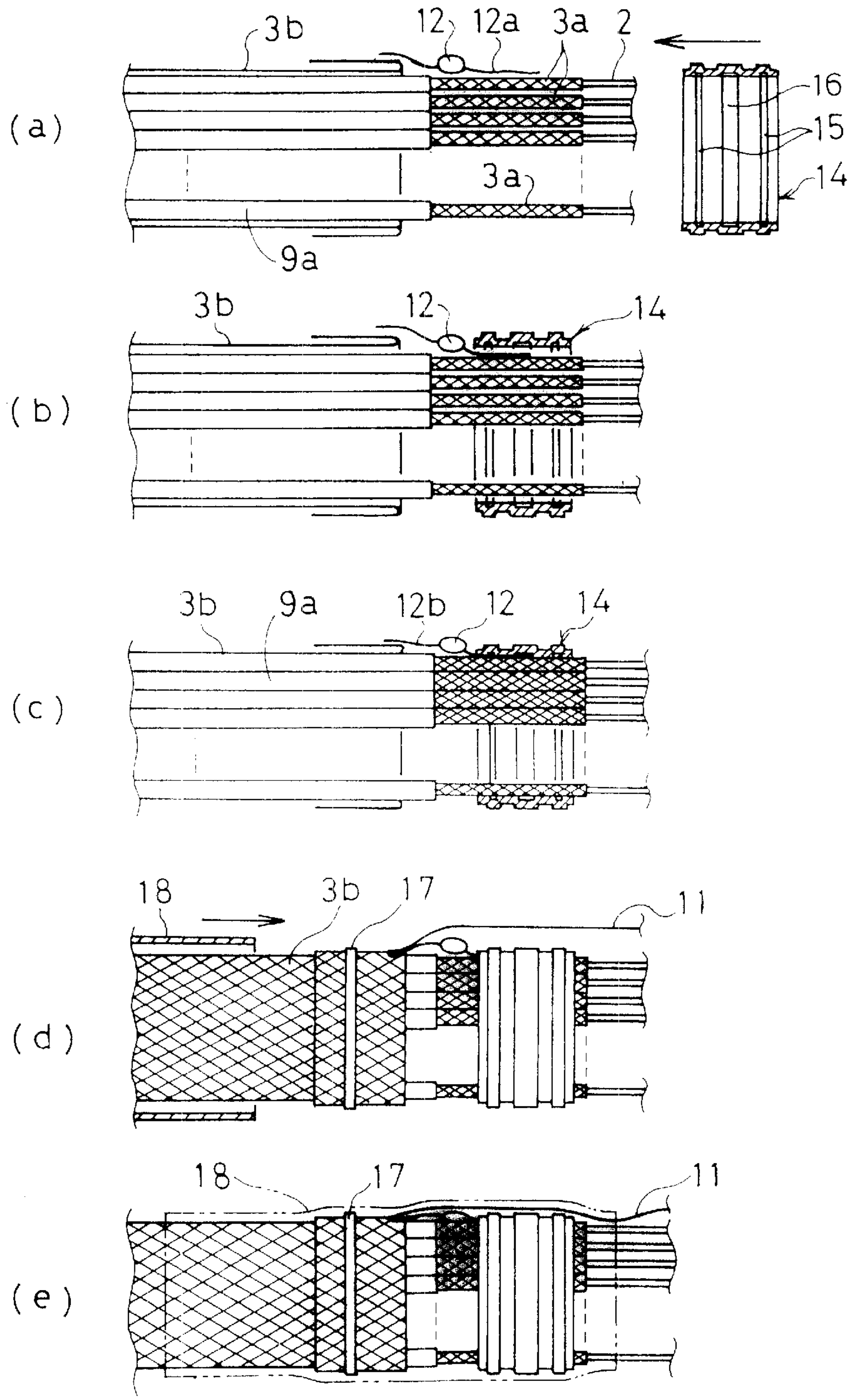
FIGS. 7(*a*) to (*e*) are flow diagrams of a terminal process of a connecting cable used in a connection method according to embodiment 4 of the present invention.
Figure 8:
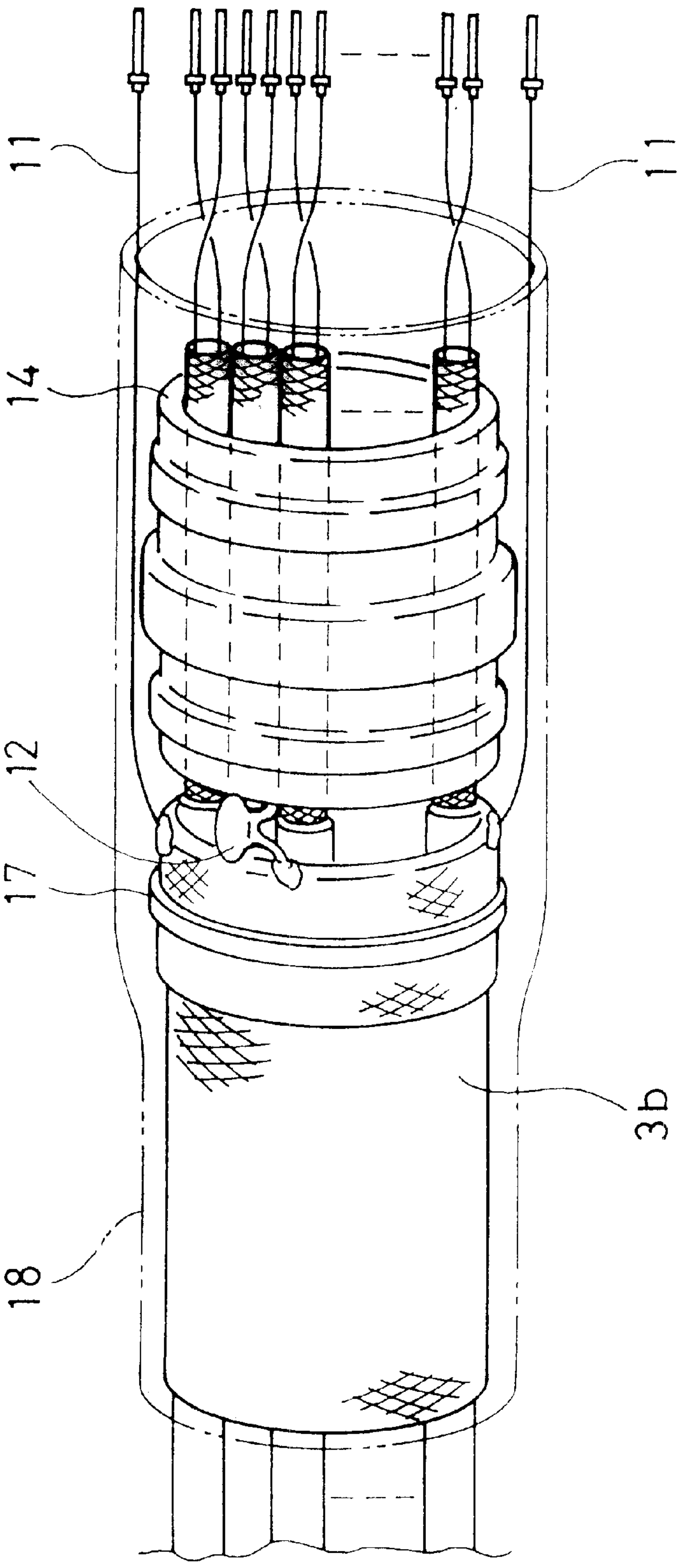
FIG. 8 is a perspective view showing the completion of the terminal process of the embodiment 4.

FIGS. 7(*a*) to (*e*) and FIG. 8 show the fourth embodiment.

In the embodiment 3, the tying process of the plurality of first external conductors 3*a* and the soldering process between the ceramic capacitor 12 are independently carried out, but, in the fourth embodiment, as shown in FIG. 7(*a*), one lead 12*a* of the ceramic capacitor 12 is made to run along the first external conductors 3*a*, and the outside of them is covered with a heat-resistant, heat-shrinkable tube 14.

On both ends of the inside of the heat-resistant, heat-shrinkable tube 14, an adhesive tape 15 is provided, and in the center, a C-like ring 16, which can deform so that the diameter of it can be decreased, is set. To the ring 16, solder or solder paste is previously applied.

The heat-resistant, heat-shrinkable tube 14, in which the adhesive tape 15 and the ring 16 are set, fits over the first external conductors 3*a* so that one lead 12*a* of the ceramic capacitor 12 lies between the first external conductors 3*a* and the ring 16, and then the outside of the heat-resistant, heat-shrinkable tube 14 is heated with a hot-air heater (not shown) such as a hot blaster.

By heating, the heat-resistant, heat-shrinkable tube 14 shrinks so that the diameter of it decreases, as shown in FIG. 7(*c*). The ring 16 flitted in the heat-resistant, heat-shrinkable tube 14 also deforms so that the diameter of it decreases to tighten and tie together the plurality of first external conductors 3*a*. Further, when the temperature of the ring 16 is elevated by the heat from the above hot-air heater, the solder or solder paste on the ring 16 dissolves, and the ring 16 and the lead 12*a* of the ceramic capacitor 12 and the plurality of first external conductors 3*a* are soldered. Consideration is given so that the shrunk heat-resistant, heat-shrinkable tube 14 is stuck on the tied first external conductors 3*a* by the adhesive tape 15 and it is not displaced.

Then, as shown in FIG. 7(*d*), the other lead 12*b* of the ceramic capacitor 12 is soldered to the second external conductor 3*b*, and finally, as shown in FIG. 7(*e*), it is covered with a heat-shrinkable tube 18, heated, and finished as shown in FIG. 8.

In this embodiment, as shown in FIG. 7(*a*), the end portion of the second external conductor 3*b* is folded to the first electronic device 1*a* side, and terminated through the bundling by a tying band 17, as shown in FIG. 8, thereby to give consideration that, if the second external conductor 3*b* is a braided wire, an assembly failure, such as part of the broken braid being put in contact with the first external conductors 3*a*, is difficult to occur.

In addition, even if the first external conductors 3*a* are comprised of a braided, or replaced by aluminum foil or metal pipe, a similar effect can be expected.

Embodiment 5

Figure 9:
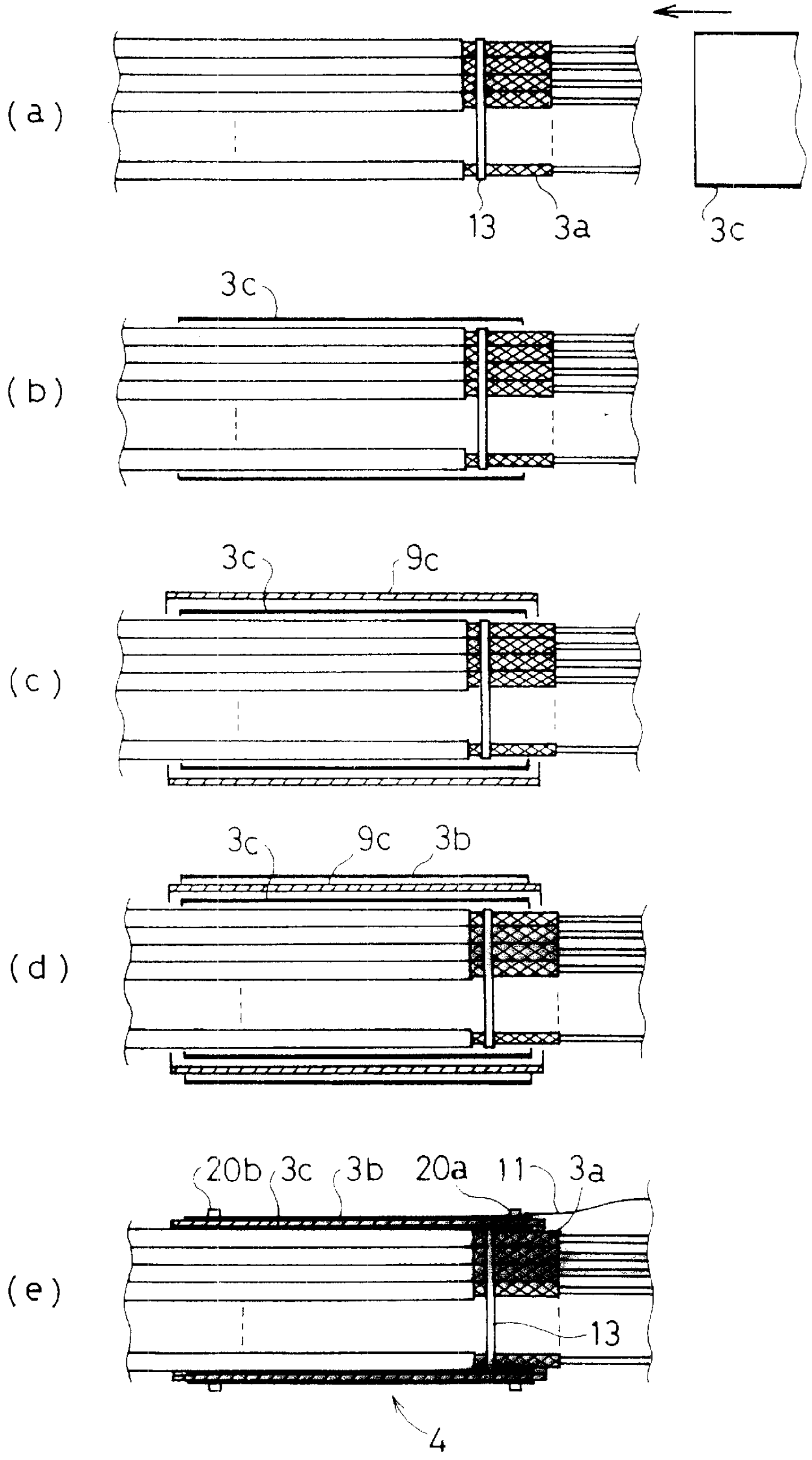
FIGS. 9(*a*) to (*e*) are flow diagrams of a terminal process of a connecting cable used in a connection method according to embodiment 5 of the present invention.

FIGS. 9(*a*) to (*e*) show the fifth embodiment.

In the fourth embodiment, by opposing the second external conductor 3*b* to the plurality of external conductors 3*a*, the stray capacity C is produced, but the capacitance of it varies depending on the thickness and material of the first external sheath 9*a* surrounding the outside of the first external conductors 3*a*. In the fifth embodiment, by providing a third external conductor 3*c* between the first and second external conductors 3*a* and 3*b*, the stray capacity is stabilized.

First, a plurality of cables shielded by the first external conductor 3*a* is tied together by a tying band 13 as shown in FIG. 9(*a*), as in FIG. 5. Then, the outside of the first external conductors 3*a* is covered with a third cylindrically shaped external conductor 3*c*, as shown in FIG. 9(*b*), thereby to contact the first external conductors 3*a* with the third external conductor 3*c* for electrical connection. Then, as shown in FIG. 9 (*c*), the third external conductor 3*c* is covered with the a third external sheath 9*c*, and as shown in FIG. 9(*d*), a second external conductor 3*b* is provided, and as shown in FIG. 9(*e*), the second external conductor 3*b* is connected to the frame 8 of the second electronic device 1*b* through a lead 11, as in the above described embodiment. In addition, the second external conductor 3*b* may be covered with a second external sheath (not shown).

Such covered third external conductor 3*c* and the first external conductors 3*a* are strongly tied together by a tying band 20*a* in the portion where they are abutting each other, for ensuring the electric connection of the third external conductor 3*c* with the first external conductors 3*a*. Similarly, the outside of the second external conductor 3*b* is bundled by the tying band 20*b* to secure the opposing faces of the third external conductor 3*c* and the second external conductor 3*b*.

With this arrangement, the end portions of the first external conductors 3*a* are connected to the frame 8 of the second electronic device 1*b* through the stray capacity formed between the second external conductor 3*b* and the third external conductor 3*c*. Further, the magnitude of the stray capacity depends on the parameters such as the opposed length and distance between the second external conductor 3*b* and the third external conductor 3*c*, and a predefined capacitance can be obtained even if the distance between the first external conductors 3*a* and the second external conductor 3*b* is changed.

Also in the fifth embodiment, the end portion of the second external conductor 3*b* may be terminated by folding it to the first electronic device 1*a* side, as in the fourth embodiment, or to increase the stray capacity, a ceramic capacitor may be connected between the second external conductor 3*b* and the first external conductors 3*a*, or between the second external conductor 3*b* and the third external conductor 3*c*.

Further, although the first, second, and third external conductors 3*a*, 3*b*, and 3*c* are all comprised of a braided wire, a similar effect can be expected even if one, two, or three of them are replaced by aluminum foil or metal pipe.

Embodiment 6

Figure 10:
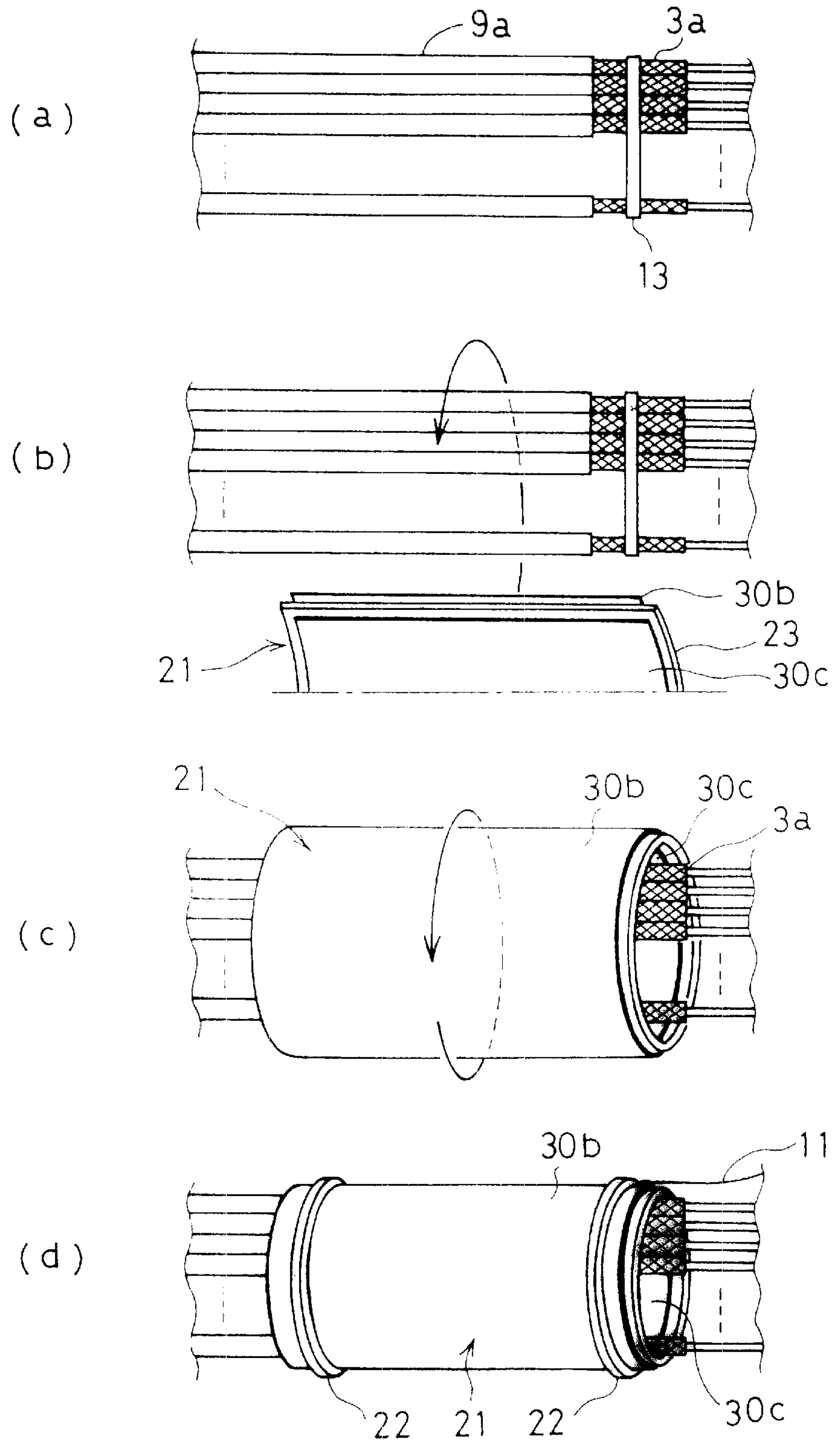
FIGS. 10(*a*) to (*d*) are flow diagrams of a terminal process of a connecting cable used in a connection method according to embodiment 6 of the present invention.

FIGS. 10(*a*) to (*d*) show the sixth embodiment.

In the fifth embodiment, the first external conductors 3*a* are covered with the third external conductor 3*c*, and thereafter the third external sheath 9*c*, second external conductor 3*b*, and second external sheath (not shown) are sequentially formed to make up the connecting cable 4, but, in the sixth embodiment, the number of steps in the termination process can be reduced more than the fifth embodiment.

First, a plurality of cables shielded by the first external conductors 3*a* are tied together by a tying band 13 in a manner similar to FIG. 5, as shown in FIG. 10(*a*). Then, a previously made laminated film 21 is wound around it, as shown in FIG. 10(*b*) and FIG. 10(*c*), and it is only needed to tie up with a tying band 22 from the outside of the laminated film 21 wound around as shown in FIG. 10(*d*), the termination process is completed.

Specifically, the laminated film 21 is formed by a first conductor sheet 30*c* and a second conductor sheet 30*b*, which are opposed to each other with an insulation film 23 being sandwiched therebetween.

With this arrangement, by winding around the laminated film 21, the first external conductors 3*a* and the first conductor sheet 30*c* are brought in contact with each other for electrical connection, and the desired stray capacity is formed between the first conductor sheet 30*c* and the second conductor sheet 30*b*, as in the fifth embodiment. Further, a large stray capacity can be obtained by increasing the thickness of the insulation film 23.

In addition, if the laminated film 21 is simply wound around, the first conductor sheet 30*c* on the inner surface side is put on the second conductor sheet 30*b* on the outer surface side at the winding end to produce electrical continuity between the two, and thus, specifically, at least at the winding end of the laminated film 21, the first conductor sheet 30*c* and the second conductor sheet 30*b* are isolated by interposing an insulation film between the two.

Further, although in the above description, the first external conductors 3*a* and the first conductor sheet 30*c* are caused to abut with each other and electrically connected by winding the laminated film 21, a construction may be provided in which, after the laminated film 21 is wound around the first external sheath 9*a*, the lead extracted from the first conductor sheet 30*c* is connected to the first external conductors 3*a*.

Moreover, in this embodiment, the laminated film 21 has been described as a three-layer structure in which the first conductor sheet 30*c* and the second conductor sheet 30*b* are opposed to each other through the insulation film 23. However, to prevent electrical continuity from being produced between the first conductor sheet 30*c* and the second conductor sheet 30*b* at the winding end when the laminated film 21 is simply wound around, it is possible to use a four-layer or five-layer laminated film in which at least one of the surface of the first conductor sheet 30*c* and the surface of the second conductor sheet 30*b* is covered with an insulation film, and extract leads from the first conductor sheet 30*c* and the second conductor sheet 30*b*. With this arrangement, the mounting efficiency further increases.

Embodiment 7

Figure 11:
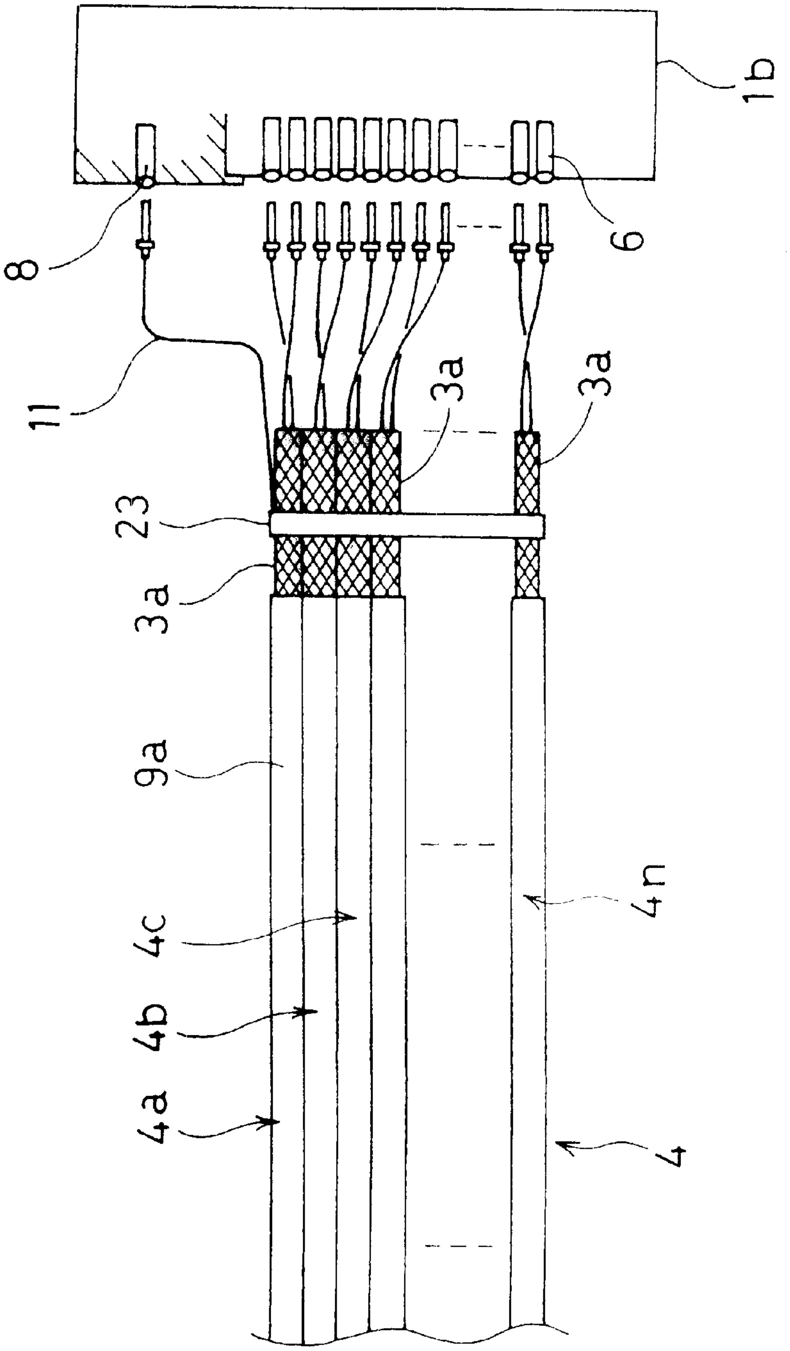
FIG. 11 is an explanatory view of a connecting cable used in a connection method according to embodiment 7 of the present invention.
Figure 12:
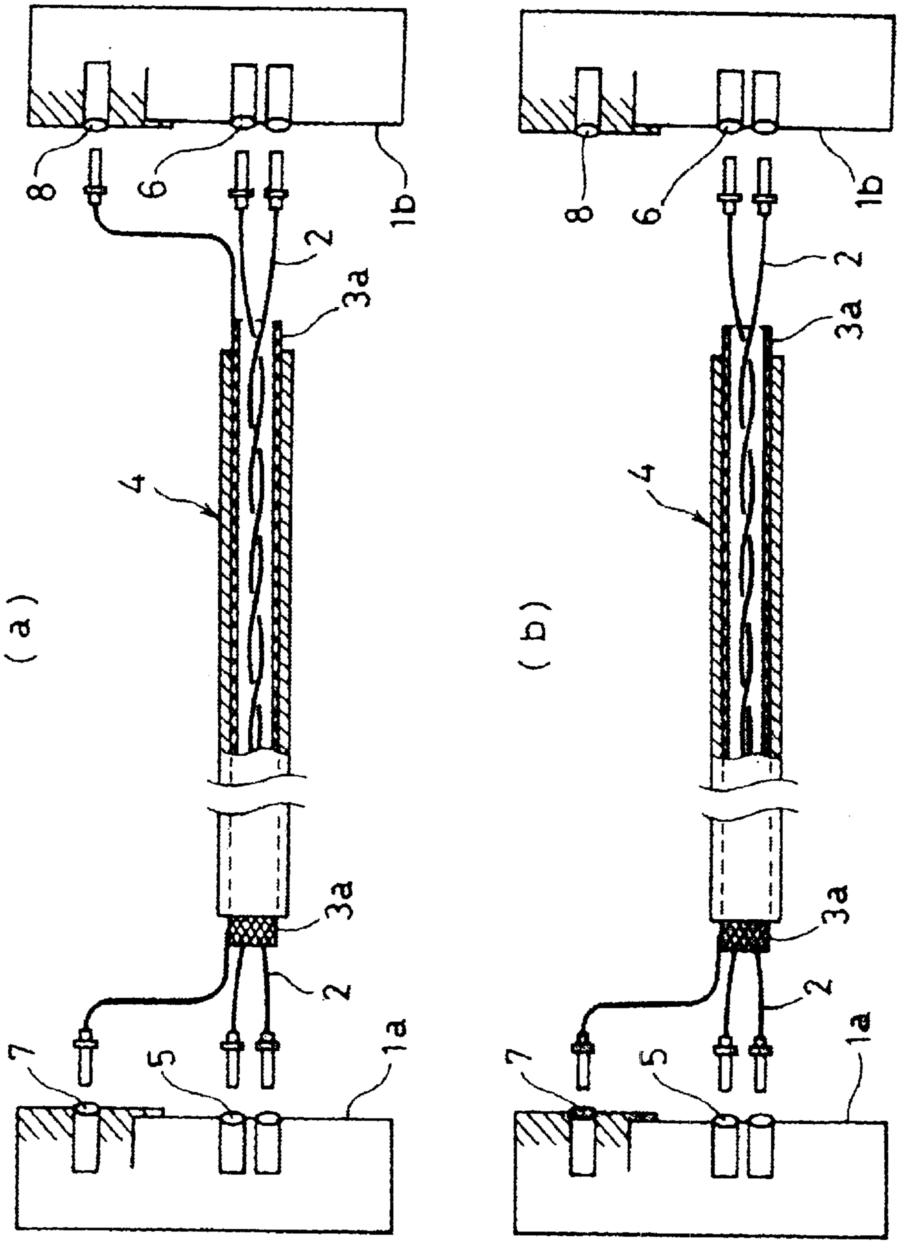
FIG.12 (PRIOR ART)
FIGS. 12(*a*) and (*b*) are partially cutaway views of a connecting cable for explaining a conventional connection method.

FIG. 11 shows the seventh embodiment.

Each embodiment above describes the case in which low-frequency signals and high-frequency signals are transmitted from the first electronic device 1*a* to the second electronic device 1*b*. However, the seventh embodiment shows a specific example of the method for connecting electronic devices for digital use only, in which high-frequency digital signals are transmitted by a plurality of juxtaposed connecting cables 4*a*, 4*b*, . . . 4*n*.

The end portions of the respective first external conductors 3*a* of the connecting cables 4*a*, 4*b*, . . . 4*n* on the first electronic device 1*a* side are respectively connected to the frame (corresponding to 7 of FIG. 1) of the first electronic device (corresponding to 1*a* of FIG. 1) through a lead. A first external sheath 9*a* covers the outside of the first external conductors 3*a*.

The end portions of the first external conductors 3*a* of the connecting cables 4*a*, 4*b*, . . . 4*n* on the second electronic device 1*b* side are bundled together by a tying band 23 of conductor or insulator to electrically connect the first external conductors 3*a* in the other end thereof, and they are connected to the reference potential of the second electronic device 1*b* through a lead 11.

With such arrangement, no separate standing wave occurs in the first external conductor of each connecting cable, so a stable operation and the reduction of undesired radiation can be expected.

Further, a similar effect can also be expected by soldering the first external conductors 3*a* to each other in the other end thereof by a ring or a braided wire instead of the tying band 23, and connecting them to the reference potential of the second electronic device 1*b* through the lead 11.

Although, in each embodiment described above, the signal line of one connecting cable of the plural number (two), the signal line of one connecting cable may be single, as seen in a coaxial cable.

What is claimed is:

1. A method for connecting electronic devices comprising:

providing a connection cable having two ends and comprising a signal line capable of conveying a signal having a frequency that causes undesired radiation-;shielding said signal line of the connection cable between the ends thereof by a first external conductor having two ends and whose length is about co-extensive with the length of said signal line;

connecting one end of the first external conductor to a reference potential of a first electronic device, shielding by a second external conductor an end portion of the other end of the first external conductor, the length of the second external conductor being less than the length of the first external conductor and defined in terms of such frequency, the length of the second external conductor being for suppressing undesired radiation; and connecting the second external conductor to a reference potential of a second electronic device.

2. The method for connecting electronic devices as set forth in claim 1, wherein the shielding by a second external conductor is performed by connecting, between the first and second external conductors, a capacitor element having a capacitance defined in terms of such frequency.

3. The method for connecting electronic devices as set forth in claim 2, wherein the capacitor element is several tens pF to several tens of thousands pF.

4. The method of claim 1, wherein said second external conductor is a braided wire.

5. The method for connecting electronic devices as set forth in claim 1, wherein the length of the second external conductor is set to generate stray capacitance required to make an impedance of the first external conductor high for a low-frequency signal band and to make an impedance of the first external conductor low for a high-frequency signal band.

6. A method for connecting electronic devices comprising:

providing a plurality of connection cables, each having two ends and comprising a plurality of signal lines at least one of which is capable of conveying a signal having a frequency that causes undesired radiation;

shielding said signal lines of the plurality of connection cables between the ends thereof by first external conductors whose lengths are about co-extensive with said signal lines, respectively;

connecting one end of each of the first external conductors to a reference potential of a first electronic device; bundling the other ends of said first external conductors, and shielding by a common second external conductor end portions of the bundle of the first external conductors, the length of the second external conductor being less than the length of the first external conductors and defined in terms of such frequency, the length of the second external conductor being for suppressing undesired radiation; and connecting the second external conductor to a reference potential of a second electronic device.

7. The method for connecting electronic devices as set forth in claim 6, further comprising connecting, between the first and second external conductors, a capacitor element having a capacitance defined in terms of such frequency.

8. A method for connecting electronic devices comprising:

providing a plurality of connection cables, each having two ends and comprising a plurality of signal lines at least one of which is capable of conveying a signal having a frequency that causes undesired radiation;

shielding said signal lines of the plurality of connection cables between the ends thereof by first external conductors whose lengths are about co-extensive with the length of said signal lines, respectively;

connecting one end of each of the first external conductors to a reference potential of a first electronic device, and electrically connecting the other ends of the first external conductors to each other; and shielding by a common second external conductor end portions of the other ends of the first external conductors the length of the second external conductor being less than the length of the first external conductors and defined in terms of such frequency, the length of said second external conductor for suppressing undesired radiation; and connecting the second external conductor to a reference potential of a second electronic device.

9. The method for connecting electronic devices as set forth in claim 8, further comprising connecting, between the first and second external conductors, a capacitor element having a capacitance defined in terms of such frequency.

10. A connecting cable having at least two ends, comprising:

a first external conductor for shielding a plurality of signal lines at least one of which is capable of conveying a signal having a frequency that causes undesired radiation, said first external conductor having a length about co-extensive with the length of said signal lines, an insulator; and a second external conductor spaced adjacent the first external conductor with said insulator between said first and second external conductors and for shielding an end portion of the first external conductor, the length of the second external conductor being less than the length of the first external conductor and defined in terms of such frequency, the length of said second external conductor being for suppressing undesired radiation;

the first external conductor for connecting to a reference potential of a first electronic device connected by said signal line, and the second external conductor for connecting to a reference potential of a second electronic device.

11. The connecting cable as set forth in claim 10, wherein at least one parameter of the opposed length between the second and first external conductors, the length of the second conductor, the distance between the first and second external conductors, and the material of said insulator are defined in terms of such frequency.

12. The connecting cable as set forth in claim 11, wherein a capacitor element connects the first and second external conductors, and the capacitance of the capacitor element is defined in terms of such frequency.

13. The method for connecting electronic devices as set forth in claim 12, wherein the capacitor element is several tens pF to several tens of thousands pF.

14. The connecting cable as set forth in claim 10, wherein the second external conductor is a braided wire, and the second external conductor of the braided wire has a distal end folded back to the side of one end of the signal line.

15. The method for connecting electronic devices as set forth in claim 10, wherein the length of the second external conductor is set to generate a stray capacitance required to make an impedance of the first external conductors high for a low-frequency signal band and to make an impedance of the first external conductor low for a high-frequency signal band.

16. A method for connecting electronic devices comprising:

providing a plurality of connection cables, each having two ends and comprising a plurality of signal lines at least one of which is capable of conveying a signal having a frequency that causes undesired radiation; sheilding said signal lines of the plurality of connection cables between the ends thereof by first external conductors whose lengths are about co-extensive with said signal lines, respectively;

connecting one end of the first external conductors to reference potentials of first electronic devices;

bundling a plurality of the other ends of said first external conductors, and shielding by a common second external conductor end portions of the bundle of the first external conductors, the length of the second external conductor being less than the length of the first external conductors and defined in terms of such frequency, the length of the second external conductor being for suppressing undesired radiation; and connecting the second external conductor to a reference potential of a second electronic device.

17. A method for connecting electronic devices comprising:

providing a plurality of connection cables, each having two ends and comprising a plurality of signal lines at least one of which is capable of conveying a signal having a frequency that causes undesired radiation; shielding said signal lines of the plurality of connection cables between the ends thereof by first external conductors whose length is about co-extensive with the length of said signal lines;

connecting one end of each of the first external conductors to reference potentials of first electronic devices, and electrically connecting the other ends of the first external conductors to each other; and shielding by a common second external conductor end portions of the other ends of the first external conductors, the length of the second external conductor being less than the length of the first external conductors and defined in terms of such frequency, the length of said second external conductor being for suppressing undesired radiation; and connecting the second external conductor to a reference potential of a second electronic device.

18. Connecting cables, each having at least two ends, comprising:

first external conductors for shielding a plurality of signal lines at least one of which is capable of conveying A signal having a frequency that causes undesired radiation, said first external conductors having a length about co-extensive with the length of said signal lines;

an insulator; and a second external conductor spaced adjacent the first external conductors with said insulator between said first and second external conductors and for shielding end portions of the first external conductors, the length of the second external conductor being less than the length of the first external conductors and defined in terms of such frequency, the length of said second external conductor for suppressing undesired radiation;

the first external conductors for connecting reference potentials of first electronic devices connected by said signal lines, and the second external conductor for connecting to a reference potential of a second electronic device.

19. A method for connecting electronic devices with a connecting cable, comprising:

shielding by a first external conductor a signal line of the connecting cable from one end thereof to the other end thereof;

connecting one end of the first external conductor to a reference potential of a first electronic device;

shielding by a second external conductor a part of the first external conductor on the other end side such that the first and second external conductors oppose to each other only for an opposed length, the length of the second external conductor being less than the length of the first external conductor; and connecting the second external conductor to a reference potential of a second electronic device such that the reference potentials of the first and second electronic devices are coupled through a stray capacity between the first and second external conductors, and setting the opposed length between the first and second external conductors to an opposed distance needed to generate a stray capacity that can make the impedance of the first external conductor high for a low-frequency signal region and low for a high-frequency signal region so as to suppress undesired radiation from the first external conductor.

20. The method for connecting electronic devices according to any of claims 19 to 15, wherein a capacitor having a capacitance value corresponding to a frequency for suppressing undesired radiation is connected between the first external conductor and the second external conductor, as an adjuster for suppressing undesired radiation.

21. The method for connecting electronic devices according to any of claims 19 to 15, wherein the second external conductor is a braided wire.

22. A method for connecting electronic devices with a connecting cable, comprising:

shielding by a plurality of first external conductors a plurality of signal lines of a connecting cable from one ends thereof to the other ends thereof, respectively;

connecting one end of each of the first external conductors to a reference potential of at least one first electronic device;

shielding by a common second external conductor the other-end-side parts of the respective first external conductors such that the first and second external conductors oppose to each other for only an opposed length, the length of the common second external conductor being less than the length of the first external conductors; and connecting the second external conductor to a reference potential of a second electronic device such that the reference potentials of the first and second electronic devices are coupled through a stray capacity between the first and second external conductors, and setting the opposed length between the first and second external conductors to an opposed distance needed to generate a stray capacity that can make the impedance of the first external conductor high for a low-frequency signal region and low for a high-frequency signal region so as to suppress undesired radiation from the first external conductor.

23. A method for connecting electronic devices with a connecting cable, comprising:

shielding by a plurality of first external conductors a plurality of signal lines of a connecting cable from one ends thereof to the other ends thereof, respectively;

connecting one end of each of the first external conductors to a reference potential of at least one first electronic device, and electrically connecting the other end of each of the first external conductors;

shielding by a common second external conductor the-other-end-side parts of the respective first external conductors such that the first and second external conductors oppose to each other for only an opposed length, the length of the common second external conductor being less than the length of the first external conductors; and connecting the second external conductor to a reference potential of a second electronic device such that the reference potentials of the first and second electronic devices are coupled through a stray capacity between the first and second external conductors, and setting the opposed length between the first and second external conductors to an opposed distance needed to generate a stray capacity that can make the impedance of the first external conductor high for a low-frequency signal region and low for a high-frequency signal region so as to suppress undesired radiation from the first external conductor.

24. A connecting cable comprising:

a first external conductor shielding a signal line from one end thereof to the other end thereof, and a second external conductor shielding a part of the first external conductor on the side of said the other end in an opposed fashion to the first external conductor for an opposed length through an insulator, the length of the second external conductor being less than the length of the first external conductor, wherein the first external conductor is connected to a reference potential of a first electronic device, the second external conductor on the other end side of the signal line is connected to a reference potential of a second electronic device, and the opposed length between the first external conductor and the second external conductor is set to be an opposed distance needed to generate a stray capacity that can make an impedance of the first external conductor high in a low-frequency signal region and low in a high-frequency signal region.

25. The connecting cable according to claim 24 or 22, wherein at least one of the opposed length between the second external conductor and the first external conductor, an inter-electrode distance between the first external conductor and the second external conductor, and a material of the insulator has a parameter set in correspondence to a frequency for suppressing undesired radiation.

26. The connecting cable according to claim 24 or 22, wherein a capacitor is connected between the first external conductors and the second external conductor, and set to have a capacitance value corresponding to a frequency for suppressing undesired radiation.

27. A connecting cable comprising:

a plurality of first external conductors shielding a plurality of signal lines from one end thereof to the other end thereof, and a common second external conductor shielding parts of the plurality of first external conductors on the side of said the other end in an opposed fashion to the first external conductors for an opposed length through an insulator, the length of the common second external conductor being less than the length of the first external conductors, wherein the first external conductors are respectively connected to a reference potential of at least one first electronic device, the second external conductor on the other end side of the signal lines is connected to a reference potential of a second electronic device, and the opposed length between the first external conductors and the common second external conductor is set to be an opposed distance needed to generate a stray capacity that can make an impedance of the first external conductors high in a low-frequency signal region and low in a high-frequency signal region.

28. The connecting cable according to claim 27, wherein the second external conductor is a braided wire, and a tip end of this braided-wire second external conductor is bent toward the one end of the signal lines.

* * * * *